United States Patent
Maeda et al.

(10) Patent No.: US 6,618,346 B1
(45) Date of Patent: *Sep. 9, 2003

(54) OPTICAL PICKUP DEVICE HAVING APERTURE RESTRICTION ARRANGEMENT

(75) Inventors: Takanori Maeda, Tsurugashima (JP); Takayuki Nomoto, Tsurugashima (JP)

(73) Assignee: Pioneer Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/492,296

(22) Filed: Jan. 27, 2000

(30) Foreign Application Priority Data

Jan. 29, 1999 (JP) .......................... 11-022299

(51) Int. Cl.[7] ................................. G11B 7/00
(52) U.S. Cl. ..................................... 369/118
(58) Field of Search .............................. 369/118, 44.24; 359/16

(56) References Cited

U.S. PATENT DOCUMENTS

| | | |
|---|---|---|
| 4,549,287 A | 10/1985 | Hatano et al. |
| 5,023,856 A | 6/1991 | Raaymakers et al. |
| 5,029,976 A | 7/1991 | Goto |
| 5,031,999 A | 7/1991 | Harada et al. |
| 5,327,270 A | 7/1994 | Miyatake |
| 5,442,615 A | 8/1995 | Ohsato et al. |
| 5,467,330 A | 11/1995 | Ishida |
| 5,515,348 A | 5/1996 | Ohsato |
| 5,673,246 A * | 9/1997 | Ootaki et al. ............... 369/112 |
| 5,699,340 A | 12/1997 | Lee et al. |
| 5,850,380 A * | 12/1998 | Kubo ........................ 369/110 |
| 6,055,076 A * | 4/2000 | Takahashi et al. ............ 359/16 |
| 6,115,349 A * | 9/2000 | Tawa et al. .................. 369/112 |
| 6,154,433 A * | 11/2000 | Hoshino et al. ............. 369/112 |
| 6,222,801 B1 * | 4/2001 | Yoo et al. ................. 369/44.23 |
| 6,321,028 B1 * | 11/2001 | Kajiyama et al. ........... 386/126 |
| 6,333,907 B1 * | 12/2001 | Iwata et al. ............ 369/112.26 |

* cited by examiner

Primary Examiner—Doris H. To
Assistant Examiner—Gautam R. Patel
(74) Attorney, Agent, or Firm—Morgan, Lewis & Bockius LLP

(57) ABSTRACT

An optical pickup device has one or a plurality of aperture restriction devices that are disposed in the optical path of a light beam that is emitted from a light source and illuminated onto an optical disk. The aperture restriction device restricts the cross-sectional shape of the light beam corresponding to the aperture in the time axis direction in comparison to that corresponding to the aperture in the radial direction and restricts the light beam in the radial direction of the optical disk by a pair of first partial arcs.

3 Claims, 7 Drawing Sheets

COMPARATIVE EXAMPLE

EMBODIMENT

FIG. 9

OPTICAL PICKUP DEVICE HAVING APERTURE RESTRICTION ARRANGEMENT

BACKGROUND OF THE INVENTION

1. Field of the Invention

The present invention is relative to an optical pickup device used for an optical information recording and reproduction device that reads and writes signals from and onto an optical information recording medium such as an optical disk, and particularly is relative to an aperture control device that is disposed in the optical path, extending from a light source to the optical disk, of the optical pickup device.

2. Description of the Related Art

The consideration to narrow the track pitch on an optical disk is given for the purpose of improving the density of recording onto the optical disk. In order to perform recording or reproduction of information onto or from the optical disk with a narrow track pitch, it is necessary to increase the numerical aperture of an objective lens included in the optical system in proportion to the narrowing of the track pitch. When the numerical aperture of the objective lens is increased, the amount of aberration that arises increases as a result of the tilting of the optical disk. To avoid the increase of aberration, a method is taken by which, for example, the pickup angle is moved to follow the tilt of the optical disk to eliminate the influence of the tilt of the optical disk. In the tilts of surface of the optical disk, a tilt component in the radial direction is due to the deflection of the optical disk. Since the tilt component in the radial direction generally does not vary suddenly, the pickup can be made to follow the optical disk this tilt component by use of a tilt mechanism that uses, for example, a gear and a motor. On the other hand, a tilt component in the tangential direction of the optical disk, in other words, the tilt in the direction of the time axis, varies in proportion to the rotation speed of the optical disk. Therefore, it is difficult to make the pickup follow this tilt component in the tangential direction of the optical disk.

Thus as a rational selection, the numerical aperture in the time axis direction may be set smaller than the numerical aperture in the radial direction so as to change the optical cutoff spatial frequency according to direction. Since the allowable width for the optical disk tilt in the time axis direction will then be enlarged with respect to that of the radial direction, it becomes possible to accommodate the optical disk with tilt using just a tilt mechanism for the radial direction. Especially in cases where it is premised that information from a recorded optical disk will be reproduced using a pickup with a small numerical aperture specialized for reproduction, this method can be considered for applications in which recording is performed using a numerical aperture which is large only in the radial direction in the recording process.

In addition to a method in which an aperture restriction of a circular form is applied to a light beam that passes through an objective lens at the pupil of the objective lens or to the cross section of the light beam that passes through the objective lens, arrangements for changing the magnitude of the aperture through which light passes correspond to the direction of the optical disk include, for example, an arrangement using an elliptical aperture as disclosed in Japanese Laid-open Patent Publication No. Hei 8-335329 (Japanese Patent Application No. Hei 7-141965). Though this method is satisfactory for realizing an aperture that is enlarged in the time axis direction as in the arrangement of this priority application, when this arrangement is to be applied as an aperture that is enlarged in the radial direction, the following problem occurs with regard to the tracking servo for following the tracks onto which recording is to be performed using the pickup.

That is, in the reading of a ROM type optical disk, whereas a tracking method, such as the phase difference method, in which the left and right phase differences are compared during the passage of a recorded pit, enables adequate tracking error signals to be obtained even when the tracking pitch is narrow, since recorded pits will not exist when the original of the ROM type optical disk or a RAM type optical disk is to be recorded, the phase difference method, etc., cannot be used. Thus the push-pull method, with which tracking is performed so that the intensity variations, due to the returning of the plus and minus diffracted primary light from previously formed tracks, will be equal, is used in such cases.

Figure 10A:
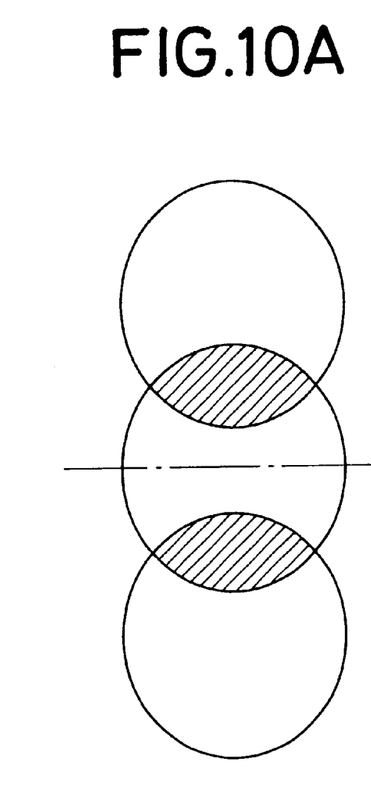
FIGS. 10A 10B and 10C are general plan views each showing the light receiving surface of the photodetector in the detection optical system of an optical pickup device.
Figure 10B:
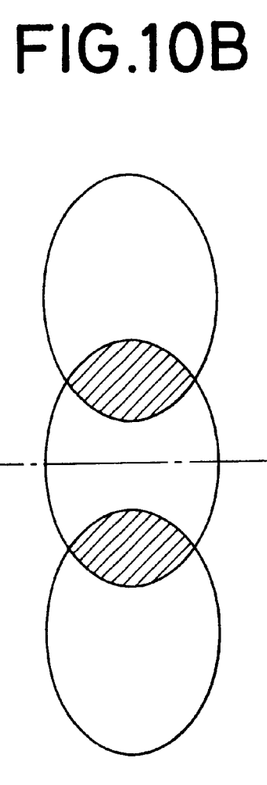

As shown in FIG. 10, with the push-pull method, the modulation factor is determined by the area of the portion (hatched portion) of the diffraction spot image on the light receiving surface of the photodetector of the pickup at which the plus/minus primary light, that is spread in the radial direction by the track, overlaps with the zero-order of light that returns directly. Whereas a relatively large modulation factor can be obtained with a circular aperture as shown in FIG. 10A, when the aperture is elliptical as shown in FIG. 10B, the area of the above-mentioned portion of overlap decreases and the modulation factor of the tracking error signal that is obtained thus decreases. This decrease in modulation factor becomes especially significant in cases where the track pitch is narrowed and the diffraction spot is moved outward in the radial direction.

Thus with an optical system in which the numerical aperture in the radial direction is made greater than the numerical aperture in the time axis direction, when the form of aperture is an elliptical aperture, stable tracking cannot be performed readily in comparison to the case where the aperture is a circular aperture.

OBJECT AND SUMMARY OF THE INVENTION

The invention has been made in view of the above-described point and an object thereof is to provide an optical pickup device with which good tracking performance can be maintained by preventing a decrease in the area of overlap in the diffraction spot on the photodetector and thereby preventing the decrease in the level of push-pull tracking errors.

The optical pickup device of the present invention is an optical pickup device, having one or a plurality of aperture restriction means that are disposed in an optical path of a light beam that is emitted from a light source and illuminated onto an optical disk, wherein the aperture restriction means restricts a cross-sectional shape of the light beam corresponding to an aperture in a time axis direction in comparison to that corresponding to an aperture in a radial direction and has a pair of first partial arcs restricting the light beam in the radial direction of the optical disk.

The invention also provides an optical pickup device, having one or a plurality of aperture restriction means that are disposed in the optical path of a light beam that is emitted from a light source and illuminated onto the optical disk via an objective lens, wherein the aperture restriction means makes a numerical aperture of the objective lens in the time axis direction of the optical disk smaller than a numerical aperture of the objective lens in the radial direction and has a pair of first partial arcs restricting the light beam in the radial direction of the optical disk.

In the optical pickup device above mentioned, the aperture restriction means has a pair of straight lines for restricting the cross-sectional shape of the light beam in the time axis direction of the optical disk.

In the optical pickup device above mentioned, the aperture restriction means has a pair of lines for restricting the cross-sectional shape of the light beam in the time axis direction of the optical disk so as to be smaller towards end parts thereof.

In the optical pickup device above mentioned, the aperture restriction means has a pair of second partial arcs for restricting the cross-sectional shape of the light beam in the time axis direction of the optical disk, which are concentric with the first partial arcs and are smaller in radius than the first partial arcs.

In the optical pickup device above mentioned, the aperture restriction means has notched parts which reduce the restriction of the cross-sectional shape of the light beam in the time axis direction of the optical disk.

In the optical pickup device above mentioned, the aperture restriction means has a pair of restriction parts formed to be symmetrical with respect to a line parallel to the radial direction.

In the optical pickup device above mentioned, the optical disk has a structure with tracks formed with a predetermined interval provided in between and the partial aperture areas defined by the notched parts are located at positions through which portions of the diffracted light due to the tracks will be transmitted.

DETAILED DESCRIPTION OF THE PREFERRED EMBODIMENTS

Embodiments of the present invention shall now be described with reference to the drawings.

Figure 1:
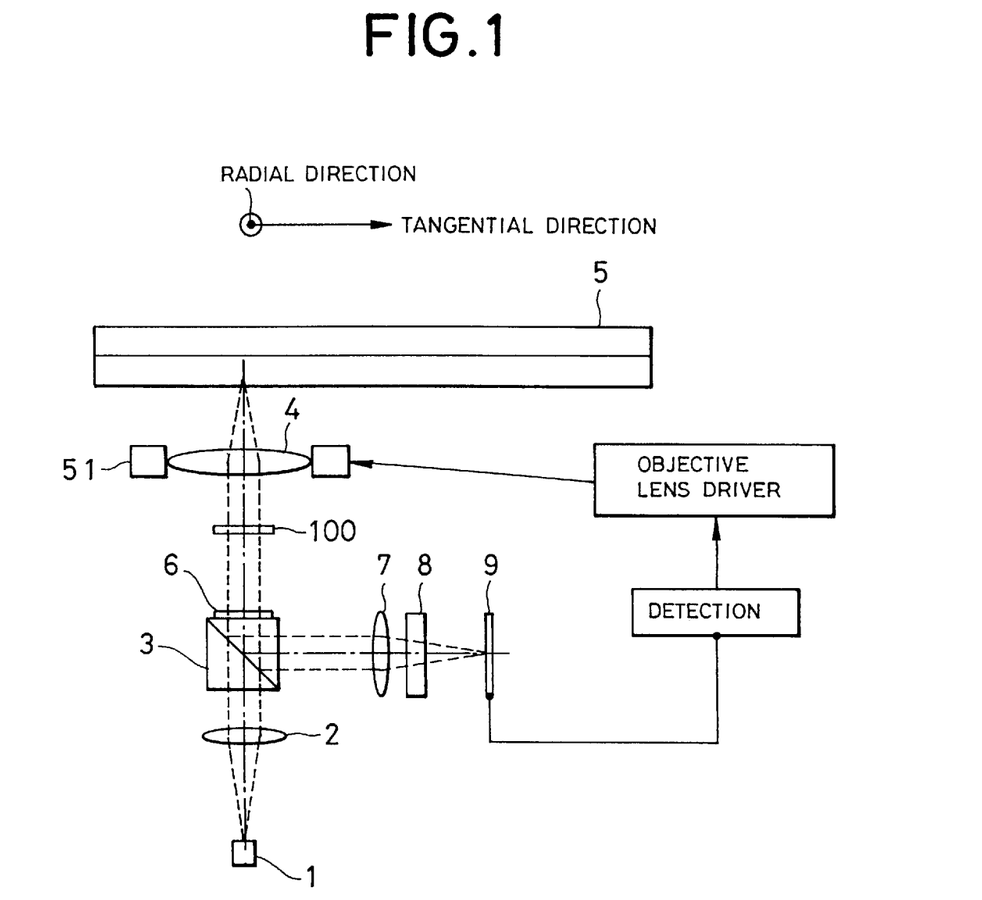
FIG. 1 is a general cross-sectional view of the optical pickup device of an embodiment.

FIG. 1 shows an optical device that uses an aperture restriction means 100. The optical pickup device of FIG. 1 is equipped with an illuminating optical system for illuminating a light beam emitted from a light source onto an optical disk, a detection optical system, which guides the optical beam reflected from the optical disk to a photodetection means, and a servo mechanism, which applies various forms of servo control to cause the light beam to follow the record tracks formed on the recording surface of the optical disk and the optical beam to be focused on the recording surface. The illuminating optical system is comprised of a semiconductor laser 1, which emits the light beam, a collimator lens 2, a polarizing beam splitter 3, a quarter wave plate 6, the aperture restriction means 100, which shapes the cross section of the light beam into a predetermined shape, and an objective lens 4, which makes the light beam into a converged beam. The detection optical system is comprised of objective lens 4, quarter wave plate 6, polarizing beam splitter 3, a detection condenser lens 7, an astigmatism generating element 8, such as a cylindrical lens, multiple lens, etc., a four-part photodetector 9, which has four light receiving surfaces that are formed as four parts, for example, by two orthogonal line segments, etc.

Furthermore, the servo mechanism is equipped with a detection circuit, which generates a focus error signal, tracking error signal, and various other servo signals using the detection results of the photodetector, an actuator or other objective lens driving mechanism 5, which drives the objective lens in the focusing direction or tracking direction based on the various servo signals, etc.

The aperture restriction means 100, which is disposed in the optical path of the light beam that is emitted onto optical disk 5 from, for example, semiconductor laser 1 of the optical pickup device, shall now be described by way of the drawings.

Figure 2:
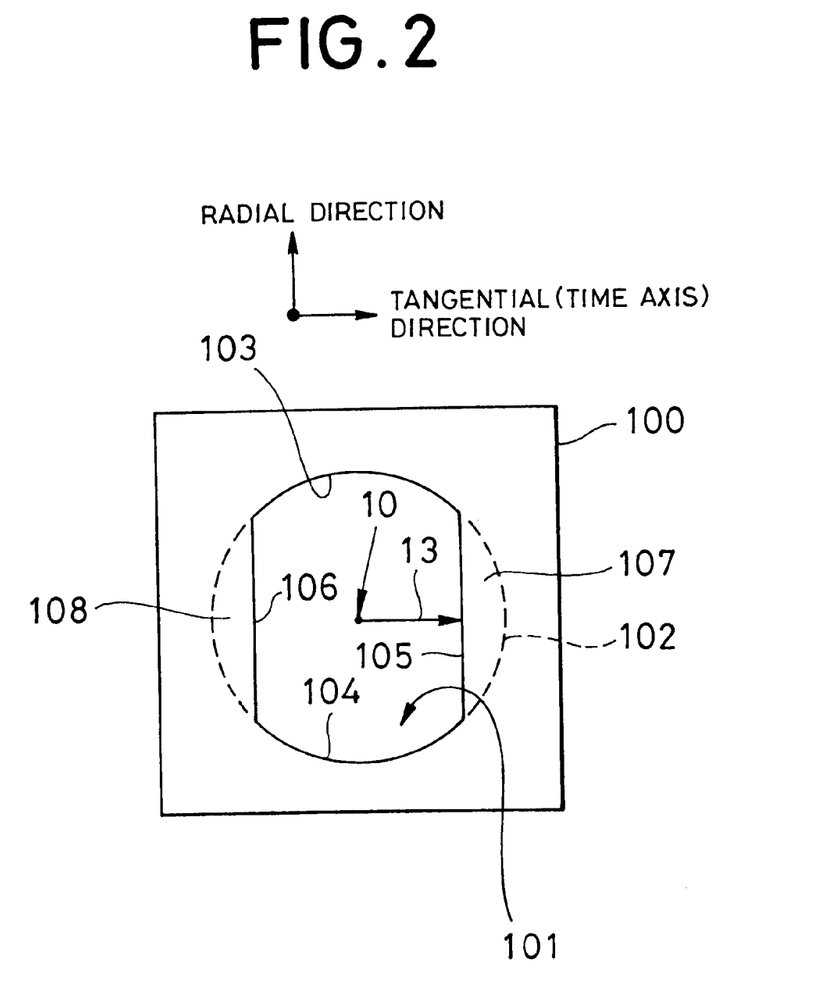
FIG. 2 is a general plan view of the aperture restriction means in the optical pickup device of the embodiment.

FIG. 2 is a plan view of aperture restriction means 100 of the first embodiment as viewed in the direction of the optical axis of the light beam. Aperture restriction means 100 is a plate-like mask that is disposed perpendicular to optical axis 10 of the light beam and has formed therein an aperture part 101, which restricts the cross-sectional shape of the light beam. The mask, which is the aperture restriction means 100, can be formed as a film or an ink layer that is adhered or printed onto collimator lens 2, polarizing beam splitter 3, quarter wave plate 6, or objective lens 4. The radial direction in FIG. 2 is the direction corresponding to the radial direction on the optical disk of the light spot formed on the optical disk by the light beam that has been transmitted through the aperture part (i.e. the tracking direction), and the tangential direction is the direction corresponding to the tangential direction on the optical disk of the light spot formed on the optical disk by the light beam that has been transmitted through the aperture part (i.e. the time axis direction, in other words, the direction orthogonal to the tracking direction in a plane parallel to the recording surface).

The edge parts of aperture part 101 are defined by a pair of arcs 103 and 104, in other words, first partial arcs that lie on a circumference 102 of a predetermined radius and centered about optical axis 10, and a pair of line segments 105 and 106, in other words, a pair of straight lines that are parallel to the radial direction and provided within circumference 102. For the sake of convenience, the surfaces defined by circumference 102 and lines 105 and 106 shall be referred to as restriction parts 107 and 108, respectively.

By transmission through aperture part 101, the cross-sectional shape of the light beam becomes one with which, like aperture part 101, the shape in the radial direction is defined by the partial arcs, the shape in the tangential direction is defined by the lines, and with which, by the restriction parts 107 and 108, the shape in the tangential direction is reduced in comparison to the shape in the radial direction by amounts corresponding to the areas of restriction parts 107 and 108.

Here, the radius of circumference 102 defines the numerical aperture in the radial direction of the objective lens in the process of incidence of the light beam, that has been transmitted through aperture part 101, on the objective lens. The distance 13 from the midpoint of each of line segments 105 and 106 to optical axis 10 defines the numerical aperture in the tangential direction of the objective lens in the process of incidence of the light beam, that has been transmitted through aperture part 101, on the objective lens. The numerical aperture signifies that the angle θ of the light beam that is projected from the edge of the objective lens to the optical disk will be such that NA=sin θ.

Figure 10C:
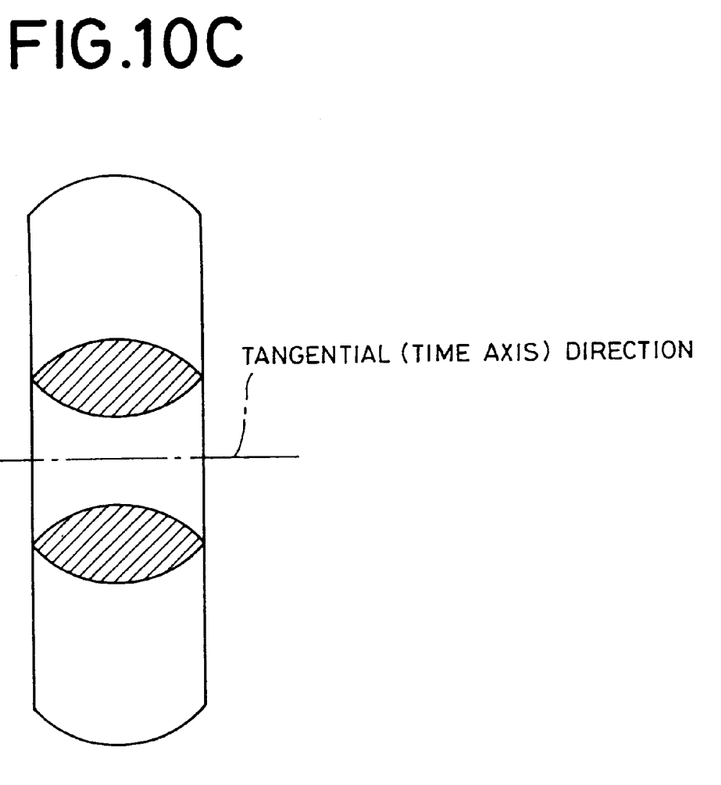

When such an aperture restriction means 100 having restriction parts 107 and 108, as shown in FIG. 2, are used, the reflected light of the light beam that has been illuminated onto a track will have diffracted light from an adjacent track next to the track overlapped therewith by nearly the same amount as when an objective lens, which is not masked in the tangential direction and having a numerical aperture in the radial direction. That is, as shown in FIG. 10C, with this embodiment, since more diffracted light from an adjacent track will be overlapped with the reflected light in comparison to an elliptical aperture, such as shown in FIG. 10B and disclosed in Japanese Laid-open Patent publication No. Hei 8-335329, more push-pull error signals can be obtained in the process of obtaining push-pull error signals using the reflected light.

Figure 3:
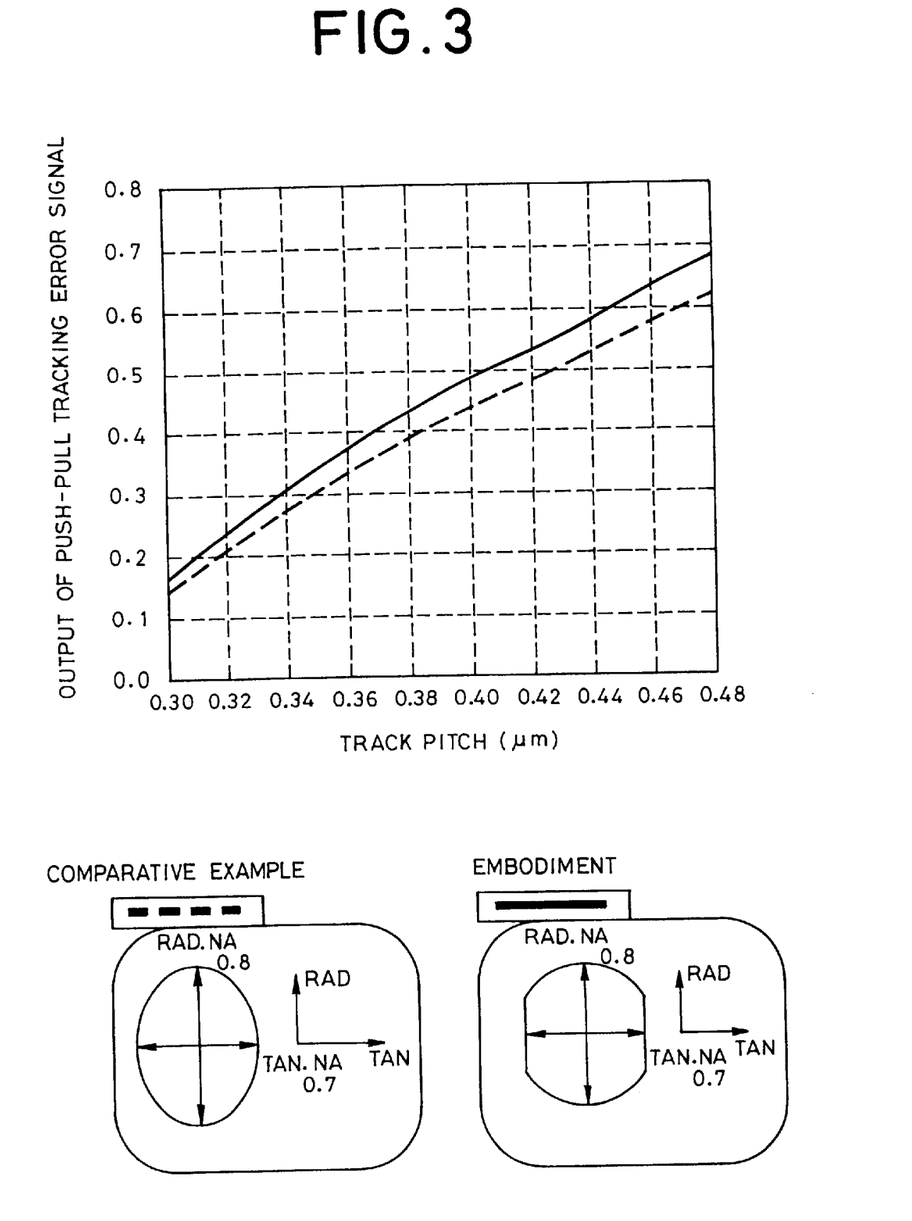
FIG. 3 is a graph that shows the relationship between the tracking pitch of the aperture restriction means and push-pull tracking error signal output of the embodiment and a comparative example.

For example, when push-pull tracking error signal outputs for an aperture control means of the present embodiment and a means with an elliptical aperture, both means having a numerical aperture of 0.8 in the radial direction and a numerical aperture of 0.7 in the time axis direction, were calculated for the case where a light source of a 430 nm wavelength is used and the track pitch is used as a parameter, it was shown that, as illustrated in FIG. 3, the level of the push-pull tracking error signal output of the present embodiment (solid line) using an aperture control means 100 having restriction parts 107 and 108, as shown in FIG. 2, is enlarged in comparison to that of the elliptical aperture means of the comparative example (broken line). Also, since the numerical aperture in the time axis direction is restricted by restriction parts 23 that are separated by a distance 13 from the optical axis, the amount of aberration generated by the tilting of the optical disk may also be restricted to a small level.

Figure 4:
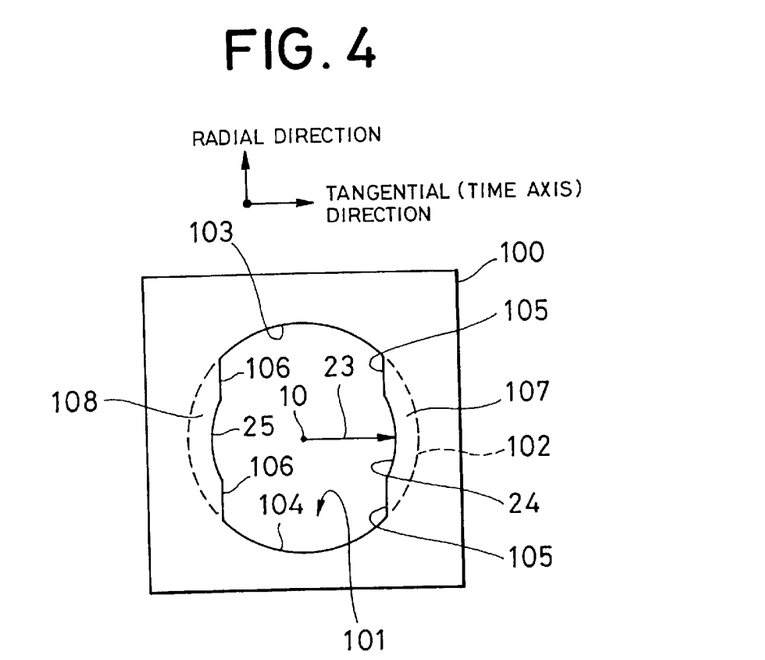
FIG. 4 through FIG. 9 are general plan views of aperture control means in optical pickup devices of other embodiments.

A second embodiment of the aperture restriction means of the present invention is shown in FIG. 4. With the aperture restriction means 100 in FIG. 4, the arcs 103 and 104 in aperture part 101 are parts of a circumference 102 of numerical aperture NAr. Straight line edges 105 and 106 restrict the cross-sectional shape of a light beam in the time axis direction. In order to make the distance 23 from optical axis 10 correspond to a numerical aperture NAt in the time axis direction, bulges are formed at the central parts of the straight lines by partial arcs 24 and 25 of a circumference of numerical aperture NAt to form concave parts in the restriction part. Aperture restriction means 100 is arranged so that the cross-sectional shape of the light beam in the radial direction of the optical disk is restricted by a pair of first partial arcs 103 and 104 and the cross-sectional shape of the light beam in the time-axis direction of the optical disk is restricted by a pair of second partial arcs, which are concentric with the first partial arcs and smaller in radius than the first partial arcs, and by straight lines 105 and 106, which are located inside circumference 102 but at the exterior of second arcs 24 and 25, and are parallel to the radial direction.

Figure 5:
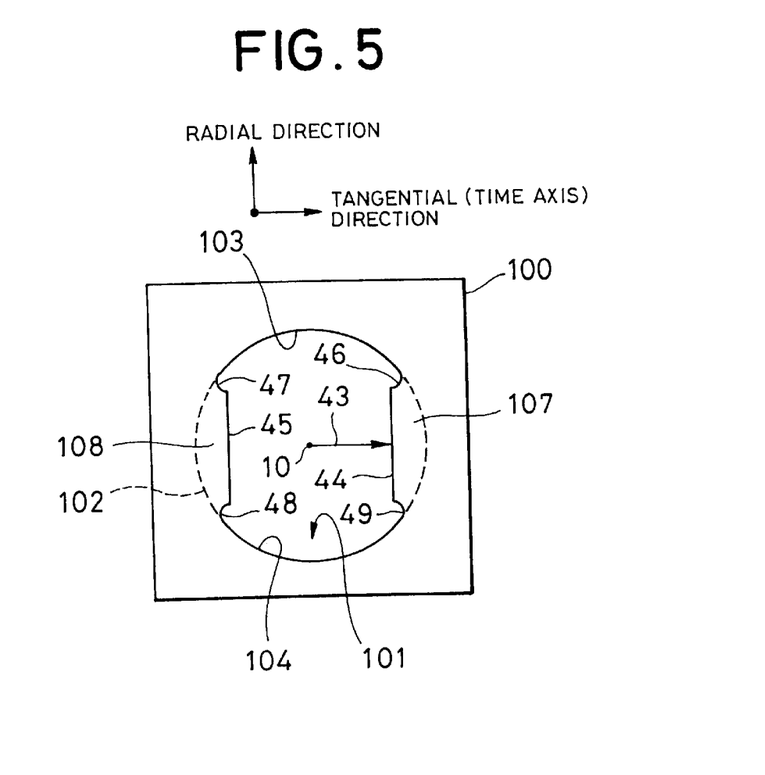

The third embodiment of the present invention is an aperture restriction means 100 having an aperture with a bobbin-like shape as shown in FIG. 5. This aperture shape is especially effective when the track pitch is relatively wide. In FIG. 5, the arcs 103 and 104, which define the cross-sectional shape (numerical aperture) of the light beam in the radial direction, define parts of aperture part 101. The straight line edge parts 44 and 45 of restriction parts 107 and 108 are straight line aperture restrictions that define the cross-sectional shape of the light beam in the time axis direction. The distance 43 from optical axis 10 to straight line edge parts 44 and 45 of restriction parts 107 and 108 is the aperture radius in the time axis direction of the light beam and defines the numerical aperture.

The edge segments 44 and 45 are shorter in length than the lines 105 and 106 of the first embodiment shown in FIG. 2 so as to provide a shape with spaces at the four corners of the aperture part shown in FIG. 2 and thus a bobbin-like aperture shape that is constricted in the time-axis direction as shown in FIG. 5. In this embodiment, since restriction parts 107 and 108 are provided with notched parts 46, 47, 48, and 49, which enlarge the arcs 103 and 104 of aperture part 101 that correspond to the radial direction of the optical disk, the diffracted light from the track that is transmitted through these notched parts overlap with the zero-order of light to enable modulation for obtaining the push-pull tracking error. If the optical disk has a structure with tracks formed at predetermined intervals, since the partial aperture areas defined by the notched parts are at positions that transmit a portion of the light diffracted by the tracks, push-pull tracking errors of a satisfactory modulation factor can be obtained even when the track pitch is relatively wide and the area of overlap of the diffraction spot is large. Also, since the numerical aperture in the time axis direction is restricted by distance 43 from the optical axis, the amount of aberration generated by the tilting of the optical disk can be restricted to be of a small level.

With the above-described embodiments, the position at which the aperture pupil is located may be close to objective lens 4 or may be arranged to be located in the optical path between light source 1 and objective lens 4. Though only simple aperture shapes with which arcs are separated by straight lines were explained for the sake of simplicity with the above embodiments, various other arrangements are possible as long as effects are exhibited based on the above-described principles.

Figure 6:
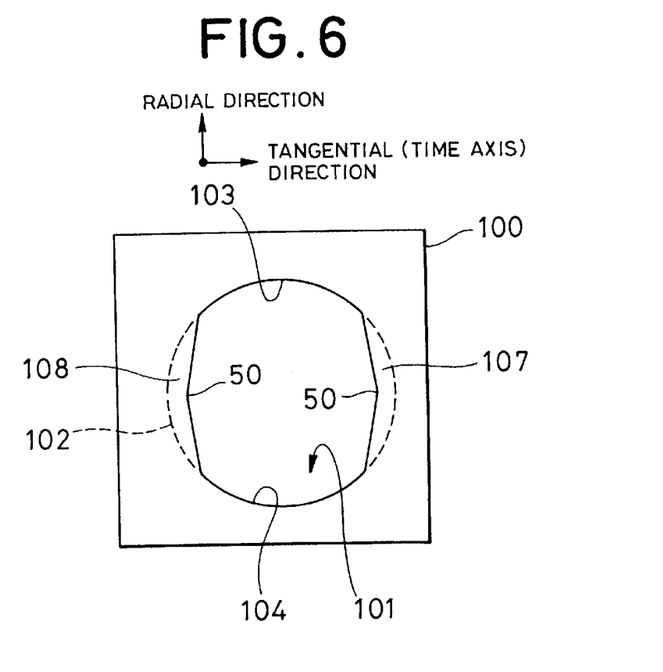

For example, FIG. 6 shows an aperture restriction means 100 with a structure 50 in which the straight line edge parts of the restriction parts 107 and 108 shown in FIG. 2 are slightly bent at the centers.

Figure 7:
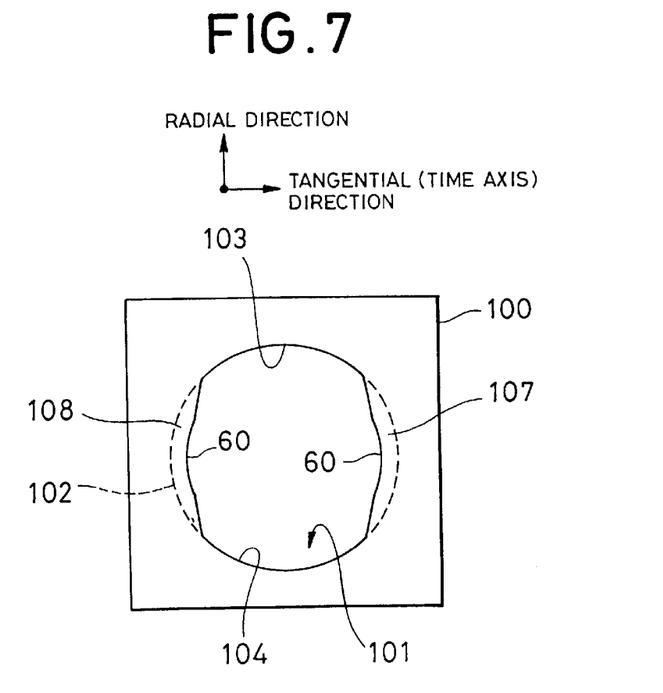

FIG. 7 shows an aperture restriction means 100 with which the bent and protruding portions of the restriction parts 107 and 108 shown in FIG. 6 are arranged as arcs 60. Thus as with the restriction parts shown in FIG. 4 and FIG. 6, aperture part 101 may be arranged so that the cross-sectional shape of the light beam in the time axis direction of the optical disk becomes smaller towards the end parts.

Figure 8:
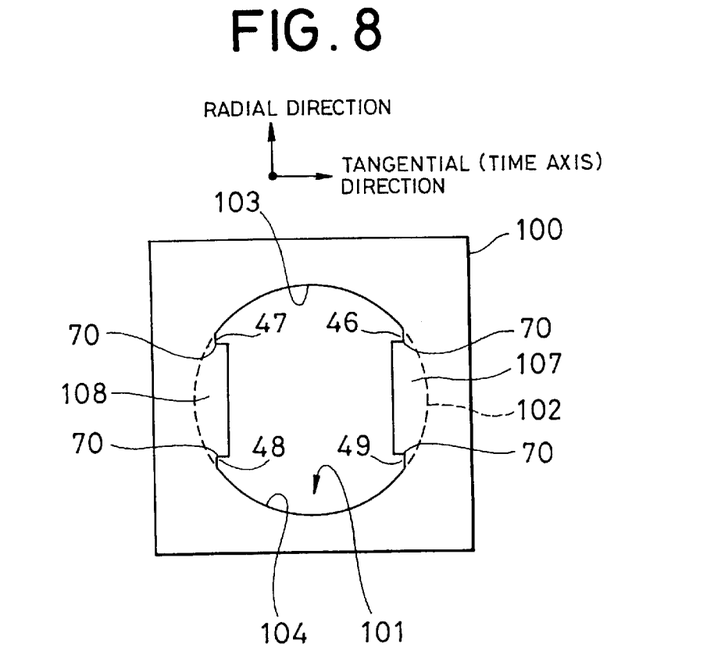

FIG. 8 shows an aperture restriction means 100 with which the shapes of the respective notched parts of the restriction parts 107 and 108 shown in FIG. 5 are provided with a stepped structure 70 by means of straight lines.

Figure 9:
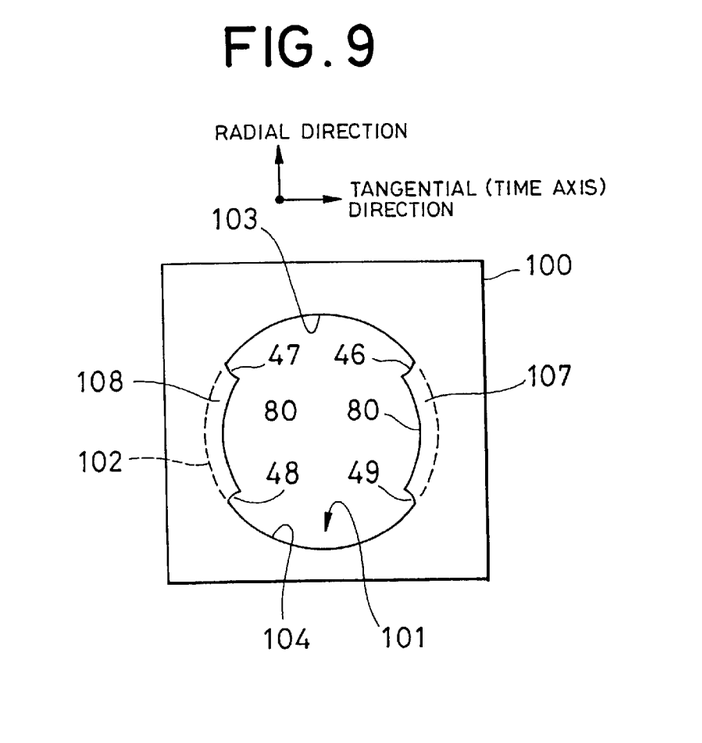

FIG. 9 shows an aperture restriction means 100 in which, as with the arrangement of FIG. 4, the straight line edge parts of restriction parts 107 and 108 are arranged as arcs 80. That is, aperture restriction means 100 is arranged so that the cross-sectional shape of the light beam in the radius direction of the optical disk is restricted by means of a pair of first partial arcs 103 and 104 while the cross-sectional shape of the light beam in the time axis direction of the optical disk is restricted by a pair of second partial arcs 80, which are concentric with the first partial arcs and are smaller in radius than the first partial arcs, and is provided with notched parts 46, 47, 48, and 49, which decrease the restriction of the cross-sectional shape of the light beam in the radial direction of the optical disk.

The respective corner parts of the above-described embodiments may be rounded, and, for example, a shape with round corners may be used as, for example, in the arrangement of FIG. 9.

Though the restriction parts of all of the above-described embodiments are shaped to be symmetric with respect to the radial direction, the aperture need not be symmetrical, and aperture shapes of broken symmetry may likewise be used within a range with which the above-described effects will be exhibited.

Though the above-described embodiments were arranged so that a single aperture restriction means restricts the apertures in the time axis direction and radial direction of the light beam, the present invention is not limited thereto. That is, an aperture restriction means, which restricts only the aperture in the time axis direction of the aperture restriction means shown in FIG. 2, FIG. 4, and FIG. 5 through FIG. 9 may be used and the shape of the objective lens or other optical parts may be used as it is as an aperture restriction corresponding to the first portion arcs that restrict the aperture in the radial direction.

With the above-described arrangements of the present invention, since the shape of the aperture, in arrangements where the numerical aperture in the radial direction of a pickup for performing recording and reproduction of the optical disk is set larger than the numerical aperture in the time axis direction, is determined so that the area in which the diffracted light due to the tracks overlap will not be reduced, the decrease in the level of push-pull tracking error can be prevented and good tracking performance can be exhibited.

What is claimed is:

1. An optical pickup device having a light source and an objective lens comprising:

at least one of aperture restriction means that is disposed in an optical path of a light beam emitted from the light source and illuminated through the objective lens onto an optical disk, wherein the aperture restriction means has an aperture part defined by a pair of first partial arcs restricting the light beam in a radial direction of the optical disk and a pair of lines restricting the light beam in a time axis direction of the optical disk so as to make a numerical aperture of the objective lens in the time axis direction of the optical disk smaller than a numerical aperture of the objective lens in the radial direction, wherein the pair of lines of the aperture restriction means has notched parts which reduce the restriction of the cross-sectional shape of the light beam in the time axis direction of the optical disk.

2. An optical pickup device as set forth in claim 1, wherein the pair of lines of the aperture restriction means is formed to be symmetrical with respect to a center line parallel to the radial direction.

3. An optical pickup device as set forth in claim 1, wherein the optical disk has a structure with tracks formed with a predetermined interval provided in between, and partial aperture areas defined by the notched parts are located at positions through which portions of diffracted light due to the tracks will be transmitted.

* * * * *